Patented Mar. 5, 1929.

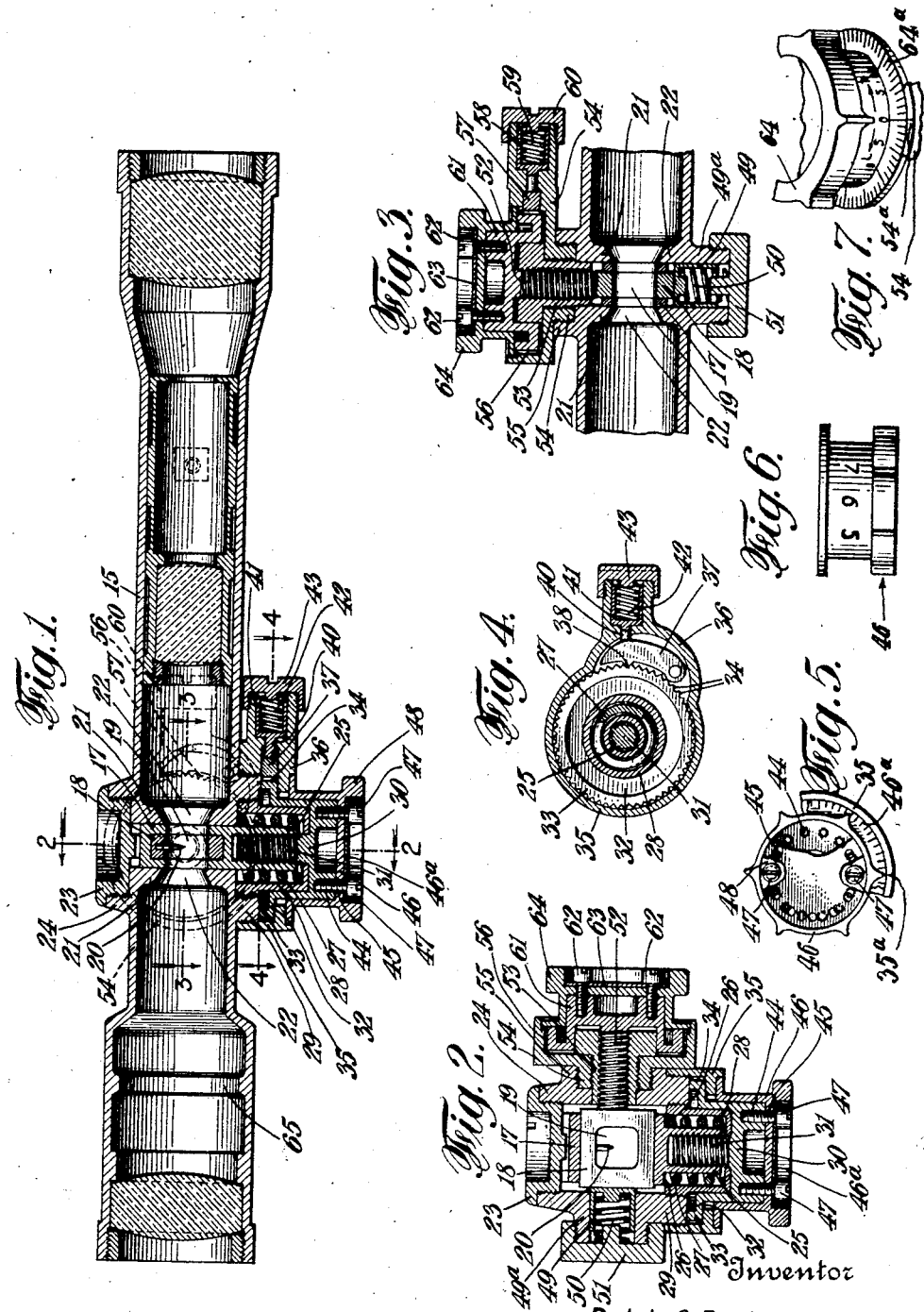

1,704,059

UNITED STATES PATENT OFFICE.

RALPH G. PACKARD, JR., OF MORRISTOWN, NEW JERSEY.

SIGHTING TELESCOPE FOR RIFLES.

Application filed May 31, 1927. Serial No. 195,357.

My present invention relates more particularly to telescopes adapted to be utilized for telescopic sights for rifles and many of its important features were primarily devised for their utility in connection with the employment of such sight on high power sporting and military rifles.

By my present invention, the telescope may be rigidly mounted on a rifle of the highest power without danger that the recoil will disarrange the sighting adjustment or cause damage to the lenses, reticule or other parts of the telescope. To this end, I provide improved means for combining the horizontal or windage adjustment of the reticule with the vertical adjustment, thus avoiding adjustment of the telescope tube and making it possible to have a mount which is absolutely fixed as well as rigid.

Other features of the invention relate to the telescope tube constructed and arranged to provide the desired rigidity and ease of assembly, and adjustment; the use of a reticule having but a single sighting post; novel means for supporting the reticule for adjustment in two directions at right angles to each other; means for moving said reticule positively both to advance and return movements; and screw means for moving said reticule positively both in advance and return movements and means for preventing back lash.

The above and other features of my invention may be more fully understood from the following description in connection with the accompanying drawings, in which Fig. 1 is a vertical longitudinal section;

Fig. 2 is a section along 2—2 of Fig. 1;

Fig. 3 is a section along the line 3—3 of Fig. 1;

Fig. 4 is a section along the line 4—4 of Fig. 1;

Fig. 5 is a detail view illustrating a vernier arrangement for adjusting the connection between a handle and a handle-operated part, and showing graduations for use in setting the handle;

Fig. 6 is a detail view of a handle showing markings corresponding to different ranges; and Fig. 7 is a view illustrating the handle for effecting the lateral adjustment of the reticule, and showing markings thereon for use in effecting the proper setting.

Referring to Figs. 1, 2 and 3, it will be seen that the telescope tube or barrel 15 is so formed at an intermediate point as to provide a guideway for a vertically movable slide or primary carriage 17, extending across the axis of the telescope and that the primary carriage is slotted transversely of the axis of the telescope to form a guideway for a secondary carriage 18, which is centrally formed with the sighting reticule including a central passage 19 into which projects a downwardly extending sighting post 20 which I have found practicable to use alone instead of a plurality of vertical and horizontal posts.

The guideway for the primary carriage 17 is formed between two inwardly projecting annular flanges 21 in a thickened portion of the tube 15 having central openings 22 flaring outwardly toward the ends of the tube 15. This guideway extends to the upper side of the tube 15 and is closed by a cup or cover 23 screwed into the interior of an upwardly projecting annular flange 24. The cover 23 may be provided at opposite sides thereof with notches adapted for engagement by a suitable instrument to apply or remove the cover.

Projecting downwardly from the lower edge of the carriage or slide 17 is an internally threaded tube or sleeve 25 of a diameter substantially the same as the thickness of the carriage 17 and leaving at opposite sides thereof shoulders 26 adapted to be engaged by a spring 27 surrounding the tube and engaged at its lower end by the bottom wall of a cup or cup-shaped member 28 threaded into the interior of an annular flange 29 projecting downwardly from the tube 15. Fitting over the cup 28 is a cup-shaped head of a screw 30 having a threaded shank 31 extending through a hole in the bottom of member 28 and screwed into the tube 25. The cup-shaped head of the screw is provided at its edge with an outstanding flange 32 having at its outer edge an upwardly projecting flange 33 engaging the lower end of the annular flange 29 and having at its outer face a series of ratchet or detent teeth 34.

Screwed on the exterior of the flange 29 is a member 35 provided with a flange engaging the lower surface of the flange 32 and holding the screw 30 against downward movement or movements away from the tube 15. The member 35 is also provided at one side wtih an enlargement 36 providing a housing for a pivoted pawl 37 having a tooth 38 engaging the teeth 34. At its outer side the pawl 37 is engaged by a pin 40 projecting through the casing from a thimble 41 slidable in a recess in said enlargement 36 and pressed inwardly by a helical spring 42 positioned therein and engaged at its outer end by a cap 43 threaded on a tubular projection of said enlargement 36 and adapted to be turned in any suitable manner as by a screwdriver applied in a groove in the outer face thereof.

Projecting downwardly from the head of the screw 30, is an annular flange having in its lower face a series of screw holes 44 in vernier arrangement with holes 45 in the bottom of a cup or cup-shaped member 46 having at its upper edge an outstanding flange seated in a groove in the lower face of member 35. The screw 30 and the member 46 are adjusted with reference to each other by bringing the proper holes 44 and 45 into register at diametrically opposite positions and secured in such adjusted position by means of screws 47 passed through a plate 48 at diametrically opposite points and through the selected holes 40 and screwed into the corresponding holes 39.

The adjustment of the reticule for elevation may then be made by turning member 46, which is formed at its lower end as a suitable hand-piece or finger-piece to the proper position as determined by suitable indications on the relatively shiftable parts.

The means for lateral adjustment of the reticule which is similar in many respects to that for vertical adjustment, will now be described.

The secondary carriage 18 is spring-pressed in one direction and screw-pressed in the opposite direction. As seen in Fig. 2, the carriage 18 is slidably engaged at the left by the bottom of a thimble 49 slidably mounted in a boss 49$^a$ on the side of the tube 15 and spring-pressed inwardly by a helical spring 50 extending inside the thimble and engaging at one end the bottom of the thimble and at its outer end by a cap or cover 51 screwed on the boss 49$^a$ and having a positioning lug extending into the outer end of the spring.

At the side opposite the thimble 49, the secondary carriage 18 is engaged by the end of the threaded shank of a screw 52, said shank being screwed into a member 53 which in turn is threaded into a member 54 having an externally threaded portion screwed into an annular boss 55. The member 54 has a flange engaging the outer end of the boss 55 and engaged at its outer face by the head of the member 53. The head of the screw 52 is provided with an annular portion lying between a peripheral flange of the member 54 and the head of the member 53, and this annular portion of the screw head is provided around its periphery with detent teeth 58 engaged by a pawl 57 mounted in an enlargement of the member 54 and engaged in turn by a pin projecting inwardly from a thimble 58 slidably mounted in said member 54 and pressed inwardly by a spring 59 engaged at its outer end by a cap 60 screwed on a projecting portion of the member 54.

At its outer side, the head of the screw 52 is provided with an annular flange 61 of less external diameter than the toothed portion and having attached thereto by screws 62 and a plate 63, a handle or finger piece 64, which is provided at its inner side with a flange engaging the outer edge of the toothed portion of the screw 52, the screws 62 being used in two sets of holes having a vernier arrangement of the same general sort as in the device to adjust for elevation.

It will be evident that, inasmuch as both the primary carriage and the secondary carriage carried thereby are supported and shifted by the screw 30, the feature of having positive movement of the primary carriage both up and down is of great importance. As far as the lateral control of the secondary carriage is concerned, very little force is required to hold or shift this carriage laterally. Furthermore, in use the greatest shocks are likely to occur in a vertical direction, as for example when used on a gun the tendency is for the recoil of the gun to swing the gun vertically rather than laterally.

In view of the great pressure which may be exerted on the telescope tube by the holding clamps therefor, the tube 15 may be provided at its forward end with an interior strengthening rib 65.

In assembling the parts (Figs. 1 and 2), the parts at the lower side of the tube 15 may be assembled in order and the primary carriage 17 with the secondary carriage 18 positioned therein inserted from above to place the lower end of the tube 25 over the upper end of the threaded shank of the screw 30. Then by turning the hand-piece or handle 46, the primary carriage 17 may be drawn down to bring the shoulders 26 into engagement with the spring 27 which tends to eliminate back lash, and then to lower the primary carriage as required against the action of the spring. The cover or cup 23 may then be screwed into the annular flange 24. The screw regulating means for the secondary carriage 18 may be attached to the tube 15 at any time and after the insertion of the primary and secondary carriages, the spring control means at the left of Fig. 2 may be applied.

With this arrangement for independent lateral and vertical adjustment of the sighting reticule and with the telescope accurately locked in immovable relation to the frame of a gun, for example, as disclosed in my copending application Serial No. 195,358, filed May 31, 1927, it is only necessary to have the axis of the telescope reasonably near parallel with the axis of the barrel, the important thing being that the position assumed is substantially the same every time the telescope is removed and replaced.

These conditions being fulfilled and the sight being rigidly in place on the gun, a very fine adjustment for zeroing of the rifle may be had by repeated shots with trial adjustments of the hand-piece 64 until the sights are correct for lateral alignment. Then the screws 62 may be removed and the hand-piece placed in the desired zero position, in which position the vernier arrangement of the screw holes above described will result in having two of the holes in alignment and through these holes the screws 62 may be inserted and screwed home. The rifle being thus permanently zeroed for lateral alignment, any desired subsequent lateral adjustments for windage and drift, may be made by merely rotating the hand-piece 64 one or more notches between teeth 56. These index notches are equally spaced and the pitch of the screw 61 is such that each notch means one-half a minute of angle of lateral adjustment.

The zeroing and adjustment of the rifle for range is accomplished in precisely the same way except the screw 30 and hand-piece 46 are the rotatable elements. In this case, however, each notch corresponds to elevation of one minute of angle.

As a minute of angle subtends one inch per hundred yards of distance, it has been found to be the most convenient unit for sight adjustment and is used in all ballistics. I have therefore made my telescope adjustments for both range and deflection in minutes of angle. Such adjustment for minutes of angle requires an accurately known focal range of the telescope inasmuch as the distance through which the reticule has to move for each minute of angle is the product of the tangent of one minute by the focal length in inches, which for the particular telescope selected is .000876 of an inch for each minute of angle.

The elevation required up to one thousand yards for most of the high powered cartridges used in this type of gun is less than sixty minutes or one degree. The pitch of the elevating screw 30 is therefore made to give the reticule its maximum movement of sixty minutes in one revolution, that is for this particular telescope the screw is formed with 19 threads to the inch and the ratchet forming part of the screw is cut with 60 notches to provide 60 teeth 34. Therefore the movement of the ratchet member one step to bring the next notch to engagement with the pawl tooth 38 would be one minute of angle and would shift the bullet in its flight to the target one inch per 100 yards of distance. The flange of the dial member or hand-piece 46 is provided with 60 graduations 46$^a$ which correspond to minutes of angle of the line of sight and the hand-piece 46 is properly positioned by bringing a graduation 46$^a$ in alignment with a marking 35$^a$ on member 35. Also figures representing distances in hundreds of yards up to one thousand yards, for any particular cartridge, are placed on the cylindrical part of the hand-piece 46 between the flange containing the graduations 46$^a$ and the finger-lugs at the head of the member 46. After the dial has been graduated to correspond to minutes of angle, such distance figures can be placed on the cylindrical part of the member 46 (Fig. 6) with sufficient accuracy, from the ballistics of well known cartridges without trial shooting. That is if the correct setting of the sight for one trial distance is obtained by trial shooting, the markings for all other ranges may be obtained from knowledge of the ballistics of the cartridge. Furthermore this arrangement and marking permits the substitution of other dials marked with distance indications to correspond with the ballistics of other cartridges whose velocity and weight of bullet differ, without trial shooting for correct adjustment.

Inasmuch as the amount of adjustment required for deflection is less than that for range, and also as it is desirable to have such adjustment as fine as possible, I have made the pitch of the lateral adjustment screw 52 half of that of the range adjustment screw, that is in this particular telescope 38 threads to the inch of the screw 52. The ratchet-forming part of the lateral adjustment screw is cut with 60 notches, providing 60 teeth 56 so that a movement of one notch or tooth corresponds to one-half minute of angle movement of the reticule or one-half inch per 100 yards on the target laterally. Thus one-half of a revolution of the screw in either direction will throw the bullet 15 minutes to the right or left of the target, which is sufficient for adjustment for deflection. The flange of the hand-piece or dial-piece 64 is provided with graduations 64$^a$ at intervals corresponding to half-minute of deflections and figures are placed on the cylindrical part (Fig. 7) so that the number of minutes can be immediately counted up for the desired setting. Also there may be marks to show which way to turn the finger-piece to throw the bullet either to the right or to the left on the target. For example, there may be arrows extending in opposite directions from the zero point and marked L for left and R for right as shown in Fig. 7 to indicate the direction of turning of the handle to shift the direction of the bullet to the right or to the left.

As hereinbefore described, a dial or finger-piece is attached to both the range and the deflection, adjusting screws by two small screws which cut through and into tapped holes that are in circular series in the head of the corresponding ratchet adjustment screw. These holes in the hand-piece and the holes in the ratchet adjustment screws are so spaced that each dial and hand-piece can be rotatably adjusted to bring any one of the graduations corresponding to a minute of angle of range adjustment screw and one-half minute of angle on the deflection adjustment screw to coincide with the zero line on the corresponding ratchet casing and two of the holes in each dial and hand-piece and two of the tapped holes in the head of the adjustment screw will always match at diametrically opposite points.

It should be understood that the telescope may be secured to the gun by any suitable means, such, for example, as disclosed in my Patent No. 1,656,496, granted January 17, 1928, and my co-pending application Serial No. 195,358, filed May 31, 1927.

I claim:

1. In a sighting telescope, a tube having at an intermediate point a thickened integral portion providing a guideway, a carriage in said guideway, a sighting reticule slidable in said carriage transversely of said guideway, and means for adjusting said carriage including a screw for moving said carriage positively in opposite directions.

2. A sighting telescope including a telescope tube, a sighting reticule therein, and means for adjusting said reticule with respect to the telescope tube, vertically for elevation and transversely for lateral displacement, said means including a screw for moving the reticule positively in opposite directions for one of said adjustments and a screw and restoring spring for effecting the other adjustment of the reticule.

3. A sighting telescope including a telescope tube, a sighting reticule therein, and means for adjusting said reticule with respect to the telescope tube, vertically for elevation and transversely for lateral displacement, said means including a screw for moving the reticule positively in opposite directions for one of said adjustments, and a screw and restoring spring for movement of the reticule for the other adjustment, said screw and spring engaging the reticule through slide surfaces and permitting sliding of the reticule in response to the action of the first-mentioned screw.

4. A sighting telescope including a telescope tube, a sighting reticule in said tube, and means for adjusting said reticule with respect to the tube, vertically for elevation and transversely for lateral displacement, including a screw for positively moving the reticule vertically in opposite directions, a thrust screw and restoring spring for lateral adjustment of the reticule, said thrust screw engaging the reticule through slide surfaces, permitting slide of the reticule in response to action of the vertical screw, and a spring for preventing back-lash in the vertical adjustment.

5. A sighting telescope including a telescope tube, a sighting reticule in said tube, and means for adjusting said reticule with respect to said tube, vertically for elevation and transversely for lateral displacement, said means including a vertical screw for positively moving said reticule in opposite directions, and a transverse screw and restoring spring for adjusting said reticule horizontally, each of said screws having a head rigid therewith and an indexing head for rotating said screw being secured to the screw head in desired zeroed relation by locking screws engaging recesses circularly arranged in vernier relation in said member and head respectively.

6. In a sighting telescope, a telescope tube, a sighting reticule within the tube and means for adjusting said reticule with respect to the tube, said means including a carriage for said reticule slidable in said tube transversely of the axis thereof and having an internally threaded sleeve projecting therefrom, an adjusting screw having a shank threaded into said sleeve and a head, and means fixed to said tube for holding the screw against movement longitudinally of its axis.

7. In a sighting telescope, a telescope tube, a sighting reticule within the tube and means for adjusting said reticule with respect to the tube, said means including a carriage for said reticule slidable in said tube transversely of the axis thereof and having an internally threaded sleeve projecting therefrom, an adjusting screw having a shank threaded into said sleeve and a head, means fixed to said tube for holding the screw against movement longitudinally of its axis, and means including a helical spring on said sleeve to prevent back-lash in shifting said carriage.

8. In a sighting telescope, a telescope tube, a sighting reticule within the tube and means for adjusting said reticule with respect to the tube, said means including a carriage for said reticule slidable in said tube transversely of the axis thereof and having an internally threaded sleeve projecting therefrom, a cup on the tube to receive said sleeve, a helical spring on said sleeve and interposed between said carriage and the bottom of said cup, and a screw having its shank extending through the bottom of said cup into said sleeve and its head engaging the bottom of said cup.

9. In a sighting telescope, a telescope tube. a sighting reticule within the tube and means for adjusting said reticule with respect to the tube, said means including a carriage for said reticule slidable in said tube transversely of the axis thereof and having an internally threaded sleeve projecting therefrom, a cup on the tube to receive said sleeve, a helical spring on said sleeve and interposed between said carriage and the bottom of said cup, and a screw having its shank extending through the bottom of said cup into said sleeve and its head engaging the bottom of said cup, said screw head having a sleeve portion fitting over said cup and having at its inner end an outstanding flange, and a member attached to said tube engaging said flange at its outer face to hold the head of the screw against the cup.

10. A sighting telescope including a telescope tube, a sighting reticule therein, and means for adjusting said reticule with respect to the telescope tube, vertically for elevation and transversely for windage or drift, said means including a primary carriage slidable transversely of said tube, a secondary carriage carrying said reticule and slidable in said primary carriage transversely of the movement thereof, a screw for moving the primary carriage positively in both directions for one of said adjustments and a screw and restoring spring for effecting the other adjustment of the reticule.

11. A sighting telescope having a sighting reticule within the telescope tube and means for adjusting said reticule with respect to the tube, said means including a carriage for said reticule slidable in said tube transversely of the axis thereof and having a threaded member projecting therefrom, an adjusting member having a projection threaded to fit said threaded member and a head, and means carried by the tube for holding said adjusting member against movement longitudinally of its axis.

12. A sighting telescope having a sighting reticule within the telescope tube and means for adjusting said reticule with respect to the tube, said means including a carriage for said reticule slidable in said tube transversely of the axis thereof and having a threaded portion, a cup on the tube in alignment with said threaded portion of the carriage, a helical spring in said cup and interposed between said carriage and the bottom of the cup, and an adjusting member having a threaded connection through the bottom of said cup with the threaded portion of said carriage and a head engaging the bottom of said cup.

13. A sighting telescope including a telescope tube, a sighting reticule therein, and means for adjusting said reticule with respect to the telescope tube, vertically for elevation and transversely for lateral displacement, said means including a carriage with respect to which said reticule is fixed, a main carriage slidable in said tube transversely of its axis and in which the first mentioned carriage is slidable, means for moving said main carriage in opposite directions for one of said adjustments, and a screw and restoring spring for adjustment of the reticule in the other direction, said screw and spring engaging the first-mentioned or reticule carriage through slide surfaces and permitting sliding of the reticule in response to the movement of the main carriage, a member on said tube having a head with a cup-headed portion to receive the head of the screw and having a recess at one side, and detent means for said screw including a spring-pressed pawl in said recess and a set of teeth on the screw head to cooperate with said pawl, the teeth being of sufficient length to permit longitudinal movement of the screw without disengagement of said teeth and pawl.

14. A sighting telescope including a telescope tube, a sighting reticule therein, and means for adjusting said reticule with respect to the telescope tube, vertically for elevation or range and transversely for lateral displacement, said means including means for moving the reticule vertically in opposite directions including a screw of such pitch as to shift the direction of the line of sight sixty minutes of angle for one complete revolution, means to detain said screw in any one of sixty positions at equal angular intervals completely around the axis of the screw, means for effecting transverse adjustment of the reticule, and a hand-piece detachably connected with said screw and having graduations thereon to cooperate with a fixed graduation to indicate the amount of rotation of the screw and consequently the change in minutes of angle of the line of sight 15. A sighting telescope including a telescope tube, a sighting reticule therein, and means for adjusting said reticule with respect to the telescope tube, vertically for elevation or range and transversely for windage or drift, said adjusting means including means for positively moving the reticule vertically in opposite directions, and means for moving said reticule transversely including a screw of such pitch as to shift the line of sight thirty minutes of angle for each revolution, means to detain said screw in any one of sixty positions at equal angular intervals completely around the axis of the screw, a hand-piece detachably connected with said screw and having graduations thereon to cooperate with a fixed graduation to indicate in minutes and half-minutes of angle the amount of shifting of the line of sight and markings to indicate the direction of turning to adjust or deflection to one side or the other.

16. A sighting telescope including a sighting reticule therein, and means for adjusting said reticule with respect to the telescope tube, vertically for elevation or range and transversely for windage or drift, said reticule-adjusting means including means for moving the reticule vertically in opposite directions and including a screw of such pitch as to shift the direction of the line of sight sixty minutes of angle for one complete revolution, means to detain said screw in adjusted position, means for effecting transverse adjustment of the reticule, a fixed marking to correspond with the zeroed position of the screw, a hand-piece for attachment to said screw and having graduations to cooperate with said fixed graduation to indicate the change in minutes of angle of the line of sight, and means for attaching said hand-piece to said screw to enable fine angular adjustment of said hand-piece with reference to the screw to bring the zero of the minute-indicating graduations on the screw into alignment with the fixed graduation when the screw is in zeroed position.

17. A sighting telescope having a sighting reticule within the telescope tube and means for adjusting said reticule with respect to the telescope, said means including a screw having an exterior head rigid therewith and provided with a circumferential series of detent teeth, a spring pressed detent pawl on the telescope for engaging said teeth, and a supplemental indexing member secured to said head, said indexing member being positively locked to said head at desired zeroed relation by two sets of circularly arranged recesses in vernier relation, in said member and head respectively, so that two diametrically opposite recesses of each series are in approximate registry in all angular positions, and a screw engaging each pair of registering recesses and clamping said member and said head in fixed relation.

18. In a sighting telescope, a telescope tube, a sighting reticule in said tube, and means for adjusting said reticule vertically and horizontally including a horizontal transverse screw of such pitch as to adjust the line of sight thirty degrees of angle for each revolution, and a hand piece for rotating said screw and being provided with markings to indicate in minutes and half-minutes of angle the amount of angular adjustment of the line of sight and also with markings to indicate the direction of turning to adjust for deflection to one side or the other.

19. In a sighting telescope adapted for rigid attachment to a gun, a telescope tube, a sighting reticule within the tube and means for adjusting said reticule with respect to the telescope vertically for elevation or range and transversely for windage or drift, including a vertical screw of such pitch as to adjust the line of sight to the extent of sixty minutes of angle for one complete revolution, and a hand-piece detachably connected with said screw and provided with graduations to co-operate with a fixed graduation to indicate the extent of rotation of the screw and consequently the adjustment of the line of sight in minutes of angle and also with markings determined by the well known ballistics of a selected cartridge to indicate the ranges to which the different settings correspond.

20. A sighting telescope including a telescope tube, movable sighting means therein, a screw for zeroizing and for range adjustment of said sighting means, detent means acting on the head of the screw, a screw-operating indicator member attached to the head of said screw and constituting one of a set of interchangeable members, each having a range scale determined by the well known ballistics of a cartridge and adapted to co-operate with a fixed index, and means for rigidly securing said indicator member to the head of said screw in different positions of angular adjustment to enable it to be shifted to and secured at zero indication, after the zeroing adjustment, without shifting the screw.

Signed at New York city, in the county of New York and State of New York, this 27th day of May, A. D. 1927.

RALPH G. PACKARD, Jr.